United States Patent
Zhang et al.

(10) Patent No.: US 9,521,500 B2
(45) Date of Patent: Dec. 13, 2016

(54) PORTABLE ELECTRONIC DEVICE WITH DIRECTIONAL MICROPHONES FOR STEREO RECORDING

(71) Applicant: Huawei Technologies Co., Ltd., Shenzhen, Guangdong (CN)

(72) Inventors: Deming Zhang, Beijing (CN); David Virette, Munich (DE); Yue Lang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 118 days.

(21) Appl. No.: 14/554,277

(22) Filed: Nov. 26, 2014

(65) Prior Publication Data

US 2015/0078555 A1   Mar. 19, 2015

Related U.S. Application Data

(63) Continuation of application No. PCT/EP2012/064086, filed on Jul. 18, 2012.

(51) Int. Cl.

| | |
|---|---|
| *H04K 1/00* | (2006.01) |
| *H04S 1/00* | (2006.01) |
| *H04M 1/03* | (2006.01) |
| *H04R 5/027* | (2006.01) |
| *H04M 1/02* | (2006.01) |

(52) U.S. Cl.
CPC .............. *H04S 1/00* (2013.01); *H04M 1/035* (2013.01); *H04R 5/027* (2013.01); *H04M 1/0202* (2013.01); *H04M 2250/12* (2013.01); *H04R 2499/11* (2013.01)

(58) Field of Classification Search
USPC .......................................................... 381/26
See application file for complete search history.

(56) References Cited

U.S. PATENT DOCUMENTS

| | | | |
|---|---|---|---|
| 8,625,826 B2* | 1/2014 | Fischer | H04R 25/405 381/313 |
| 9,247,334 B2* | 1/2016 | Zhang | H04M 1/035 |
| 2009/0129621 A1 | 5/2009 | Izuchi et al. | |
| 2012/0077480 A1 | 3/2012 | DeLuca | |
| 2016/0057522 A1* | 2/2016 | Choisel | H04R 1/08 381/92 |

FOREIGN PATENT DOCUMENTS

| | | |
|---|---|---|
| CN | 101161030 A | 4/2008 |
| EP | 1 885 155 A1 | 2/2008 |
| JP | H025977 U | 1/1990 |
| WO | WO 99/02010 A1 | 1/1999 |

* cited by examiner

*Primary Examiner* — Creighton Smith

(57) ABSTRACT

The invention relates to a portable electronic device, comprising: at least two directional microphones for stereo sound pickup, each one of the two directional microphones defining a direct sound direction and an opposite sound direction towards which the directional microphones are directed; and a housing comprising for each of the directional microphones a first hole and a second hole, the first hole being located at a different side of the portable electronic device than the second hole.

23 Claims, 11 Drawing Sheets

PORTABLE ELECTRONIC DEVICE WITH DIRECTIONAL MICROPHONES FOR STEREO RECORDING

CROSS-REFERENCE TO RELATED APPLICATIONS

This application is a continuation of International Application No. PCT/EP2012/064086, filed on Jul. 18, 2012, which is hereby incorporated by reference in its entirety.

TECHNICAL FIELD

The present invention relates to a portable electronic device with microphones for stereo audio recording, in particular to a mobile phone, a Smartphone and a Tablet PC with microphones for stereo audio recording.

BACKGROUND

XY techniques for stereo audio recording as depicted in FIG. 9 use two coincident microphones 905a, 905b, that means, microphone capsules at the same place, i.e., two microphones 905a, 905b are mounted closely together to prevent almost totally time delay effects. At ideal conditions, this results in pure intensity stereo signals which can be summed to mono without comb-filter effects. This provides an unrestricted mono compatibility.

The XY technique uses two identical directional microphones 905a, 905b, e.g., cardioid or figure eight microphones. In relation to the recording axis 910, they are arranged at equal and opposed offset angles α with regard to their main directions 902a of stereo recording.

Or put differently, in relation to the recording axis 910 of the directional microphone arrangement formed by the pair of coincident directional microphones 905a, 905b, the two coincident microphones 905a, 905b are arranged such that the directional microphones' direct sound directions 902a are offset from the recording axis 910 by equal and opposed offset angles α. The recording axis 910 is also referred to as recording direction 910 of the microphone arrangement, central axis 910 for stereo recording or central direction 910 for stereo recording. Typical offset angles α are between −/+30° and −/+60° apart from the central direction of the stereo recording represented by the recording axis 910. For cardioid microphones, as shown in FIG. 9, the X microphone 905b pointing leftward supplies the left signal directly, and the Y microphone 905a pointing rightward supplies the right signal. The stereophonic properties depend on the directional characteristics of the microphones and the offset angle α. A reduced angle α will provide a minimum or narrow stereo image, whereas a large angle α will provide a wider stereo image. Thus, the angle β as depicted in FIG. 9, with β=2*α, represents a measure of the width of the stereo image, wherein the larger angle β, the larger the perceived width of the stereo image.

FIG. 10 shows the Blumlein stereo arrangement based on figure eight microphones. The L microphone 1005b has its main lobe pointing leftward and provides directly the left signal, while the R microphone 1005a offers the perfect symmetry and provides the right signal. The two microphones 1005a, 1005b correspond to the two directional microphones 905a, 905b of FIG. 9, and the direct sound directions 1002a of the two directional microphones 1005a, 1005b correspond to the direct sound directions 902a of the two directional microphones 905a, 905b of FIG. 9.

The Blumlein pair consists of an array of two matched microphones 1005a, 1005b of bi-directional pickup pattern, positioned 90° from each other, which corresponds to an offset angle α of 45° for each of the two directional microphones 1005a, 1005b with regard to the central direction 1010 for stereo recording. Ideally, the transducers should occupy the same physical space; as this is impossible the microphone capsules are placed as close to each other as physically possible, generally with one microphone 1005a centered directly above the other 1005b. The microphone array is oriented so that the line 1010 bisecting the angle β between the two microphones 1005a, 1005b, i.e. the recording axis 1010 points towards the sound source to be recorded. The pickup patterns of the microphone pair combined with their positioning, delivers a high degree of stereo separation in the source signal.

There are two typical microphone configurations in current mobile phones. The first one has only one single omnidirectional microphone which is used for communication and mono sound pickup. The other configuration is shown in FIG. 11. The mobile phone has two omnidirectional microphones, a main microphone 1113 and an auxiliary microphone 1107. The main microphone 1113 is arranged on the bottom side 1117 of the mobile phone which can be associated together with dock connectors 1109 for optional dock accessories and USB port 1111. The auxiliary microphone 1107 is located at the back side 1115 or back cover of the mobile phone together with camera 1105, e.g., 5 megapixel camera with autofocus, camera flash 1101 and speaker 1103. The main microphone 1113 is used for the sound pick up, i.e., for communication application as well as simple audio/video recording. The auxiliary microphone 1107 is used for noise cancellation and gain control.

SUMMARY

It is the object of the invention to provide a mobile device such as a mobile phone, a Smartphone or a Tablet PC with stereo sound pick up ability.

It is a further object of the invention to provide a mobile device such as a mobile phone, a Smartphone or a Tablet PC with improved stereo sound pick up ability.

These objects are achieved by the features of the independent claims. Further implementation forms are apparent from the dependent claims, the description and the figures.

The invention is based on the finding that replacing the omnidirectional microphones of a mobile phone by directional microphones improves the stereo sound pick up ability. The present invention describes a specific housing for directional microphones. Normally, the thickness of Smartphones is constrained to several millimeters; this specific form factor is quite different from other terminals such as cameras and camcorders and imposes different constraints in terms of microphone positions and housing. The present invention improves the situation by placing the directional microphones non-coincidentally for stereo sound pickup, wherein each directional microphone has two holes arranged on different sides of the device. Due to the distance between the microphones such arrangement provides better left/right separation and wider stereo sound image for small portable electronic devices, e.g. mobile phones, smartphones and tablet PCs.

An omnidirectional microphone needs only one hole in the terminal as opposed to directional microphones which require two holes. The omnidirectional microphone offers a uniform directivity pattern in all directions, equivalent to a sphere, and only one hole is then required for the microphone housing 1113. The size of the hole and the actual microphone housing 1113 will affect the directivity of the complete system, but a single hole is sufficient for perfect sound pickup. Two omnidirectional microphones mounted with a spacing of several centimeters can also be used in order to obtain a stereo recording, however, such system will provide only a limited stereo image, due to the short distance when mounted on a mobile phone and the uniform directivity which limits the energy differences between the microphones.

In order to describe the invention in detail, the following terms, abbreviations and notations will be used:
Mic: microphone,
L: left channel,
R: right channel,
a: weighting factor,
A, B, C, D: users.

Within the context of this application, the terms "sound pick up" and "sound recording" are used synonymously, if not mentioned differently, and refer in general to the conversion of acoustical signals into electronic signals. In other words, the term "sound recording" shall not be interpreted in the limited sense of recording and storing the audio signals (e.g. in analogue or digital form in a memory or on a tape or on any other storage medium) as the embodiments of the invention can also be used for simply converting the acoustic signals into electronic signals to send them to any information sink, wherein the information sink maybe another terminal, a storage medium, etc.

In the following, directivity polar patterns are defined. A given microphone's pattern of directivity, called its polar pattern is defined by the particular transducer design implemented in its capsule. A polar diagram or a polar pattern is a form of a two-dimensional contour map showing the microphone's output usually in dB at different angles of incident of a sound wave. The greater the plot is from the center the greater the output of the microphone is at that angle. A diagrammatic representation of a given capsule's polar pattern is intended to show its average response. Exact patterns will be frequency dependent. In general most off-axis attenuation occurs with higher frequencies where wavelength is shorter and the masking effect of the body is therefore greatest.

The following five most common directivity characteristics are known as:
  omni-directional (all around),
  figure eight (bi-directional) front and rear,
  cardioid (unidirectional) heart shaped,
  super cardioid,
  hyper cardioid,
wherein, the term directional microphone is used as the generic term for all microphones which are not omnidirectional microphones, and refers to microphones that respond differently to sounds arriving from different directions, wherein the direction dependent sensitivity to acoustic signals is defined or described by the directional microphones' directivity pattern.

In more detail, all microphones work by sensing the pressure difference on either side of a thin sheet known as a diaphragm. Ultimately, there are really only two fundamental microphone principles—pressure-operated (omnidirectional) and pressure-gradient (directional).

In a pressure-operated microphone, one side of the diaphragm is open to the atmosphere and is able to respond to the microscopic changes in pressure representing sound. The other side faces an enclosed volume which effectively contains a fixed 'reference' air pressure so the diaphragm moves in response to the difference between the passing sound wave and the reference. It doesn't matter from which direction the sound wave comes, or where it is headed, the microphone merely senses its presence, and is therefore omnidirectional in its polar pattern.

In a pressure-gradient microphone, the diaphragm is still sensitive to the difference in pressure on either side, but this time both sides are exposed to the atmosphere, and therefore to the changing pressure caused by passing sound waves. A sound arriving in the plane of the diaphragm will present identical pressures on both sides and, consequently, there will be no net movement. There is no pressure gradient across the diaphragm and so the microphone is deaf to sounds on this axis. In contrast, sounds arriving perpendicular to the diaphragm will create a large pressure difference between front and rear, and it will be moved a maximum amount as a result. This mechanism's polar pattern therefore looks like a figure eight, with the maximum sensitivity to sound on-axis to the diaphragm and the minimum sensitivity perpendicular to this. The same principal applies to cardioid, super cardioids and hyper cardioid microphones.

Accordingly, the term directional microphone encompasses, for example, figure eight microphones, cardioid heart shaped microphones, super cardioid microphones and hyper cardioid microphones but not omnidirectional microphones.

The term "coincident microphones" refers to two (or more) microphones which are placed as close as possible to each other so that the path length from any sound source to either microphone of the coincident microphones is for all practical purposes, the same. Indeed, the distance between the microphones can be then considered as negligible compared to the wavelength of the audio signal. Therefore, the term "coincident microphones" refers to a microphone arrangement, wherein the two or more microphones, typically a pair of directional microphones, are arranged less than 2 cm spaced apart from each other, preferably less than 1 cm spaced apart from each other, and more preferably overlap, wherein the closer the transducers of the coincident microphones are the smaller the propagation delay between the coincident microphones and the better the stereo image obtained by, for example, simply using the audio signals obtained from the coincident directional microphones. As opposed to coincident microphones, the term "non-coincident" microphones refers to two (or more) microphones which are spaced in order to introduce some delay between the different signals depending on the direction of the sound. Therefore, the term "non-coincident microphones" refers to a microphone arrangement, wherein the two or more microphones, typically a pair of directional microphones, are arranged more than 2 cm spaced apart from each other.

According to a first aspect, the invention relates to a portable electronic device, comprising: at least two directional microphones for stereo sound pickup, each one of the two directional microphones defining a direct sound direction towards which the directional microphones are directed and an opposite sound direction; and a housing comprising for each of the directional microphones a first hole and a second hole, the first hole being located at a different side of the housing of the portable electronic device than the second hole.

The direct sound direction is the direction in which the sensitivity of the directional microphone is at its maximum with positive weighting, the opposite sound direction is in opposite direction to the direct sound direction. The first hole is a hole arranged for sound pickup in the direct sound direction, the second hole is a hole arranged for sound pickup in the opposite sound direction. The first hole can but does not have to be located in the front side of the housing. The second hole can but does not have to be located in the back side of the housing. The direct sound direction of each microphone is oriented towards the first hole. It may be aligned to the center of the first hole or to another coordinate in the first hole. The opposite sound direction of each microphone is oriented towards the second hole. Similarly, it may be aligned to the center of the second hole or to another coordinate in the second hole.

In a first possible implementation form of the portable electronic device according to the first aspect, the housing is configured for housing the portable electronic device and is formed as a plate defined by two main areas framed by a top side, a bottom side and a first and a second lateral side, wherein the two main areas define a front side and a back side of the housing.

The plate is a hollow plate for accommodating the printed circuit board with the electronic circuits of the portable electronic device. Its edges can be rounded for avoiding any risk of injury. The housing may be formed of synthetic material or plastics. The housing may be a common housing of a mobile phone such as depicted in FIG. 11. The screen is usually arranged at the front side of the housing, i.e. at that side which is one of the main areas of the plate. The main areas are the areas which have the largest size. The front side of the plate or of the housing is that side which faces to the user when he is interacting with the electronic device. The back side is the side opposed to the front side. Depending on the spatial position of the electronic device, the top side may be the side at the top position of the electronic device, the bottom side may be the side at the bottom position of the electronic device and the lateral sides may be the sides at lateral positions of the electronic device.

It is to be understood that the housing may have many different designs, and that, in particular, the back side, the top side, the bottom side and the two lateral sides are not limited to sides which are flat and arranged rectangular to adjacent sides. On the contrary, the housings of the portable electronic devices according to the first aspect and any of its implementation forms may have many different designs, wherein in particular, the back side, the top side, the bottom side and the two lateral sides can be flat, curved, graded, etc, and wherein, furthermore, depending on the form of the sides the transition between neighboring sides may be smooth, in particular in case of radiated or rounded backsides.

In a second possible implementation form of the portable electronic device according to the first implementation form of the first aspect, the first hole for a first directional microphone is located in the first lateral side, the first hole for a second directional microphone is located in the second lateral side and the second holes for the first and second microphones are located in the bottom side or in the top side of the housing such that directivity polar patterns of the two directional microphones are directed towards the lateral sides of the housing.

The directivity polar patterns are oriented towards the direct sound direction of the microphones.

In a third possible implementation form of the portable electronic device according to the first implementation form of the first aspect, the first hole for a first directional microphone is located in the top side, the first hole for a second directional microphone is located in the bottom side and the second holes for the first and second microphones are located in the first lateral side or in the second lateral side of the housing such that directivity polar patterns of the two directional microphones are directed towards the top and bottom sides of the housing.

In a fourth possible implementation form of the portable electronic device according to the first implementation form of the first aspect, the first hole for a first directional microphone and the first hole for a second directional microphone are located in the front side and the second hole for the first directional microphone and the second hole for the second directional microphone are located in the back side of the housing such that directivity polar patterns of the two directional microphones are oriented towards the front side of the housing.

In a fifth possible implementation form of the portable electronic device according to the fourth implementation form of the first aspect, the first hole for the first directional microphone is located in the front side within a first distance d1 from a lateral side of the housing and the second hole for the first directional microphone is located in the back side within a third distance d3 greater or equal than the first distance d1 from the lateral side of the housing, wherein a difference of the third distance d3 and the first distance d1 is dimensioned for determining a stereo recording width of the stereo recording arrangement formed by the two directional microphones with respect to the lateral side of the housing.

In a sixth possible implementation form of the portable electronic device according to the fourth implementation form of the first aspect or according to the fifth implementation form of the first aspect, the first hole for the first directional microphone is located in the front side within a second distance d2 from the bottom side of the housing and the second hole for the first directional microphone is located in the back side within a fourth distance d4 greater or equal than the third distance d2 from the bottom side of the housing, wherein a difference of the fourth distance d4 and the second distance d2 is dimensioned for determining a stereo recording width of the stereo recording arrangement formed by the two directional microphones with respect to the bottom side of the housing.

The distances d1, d2, d3 and d4 determine the orientation of the directional microphones and, thus, the stereo recording width. The ratio between d1 and d3 on one hand, and the ratio between d2 and d4 on the other hand allow to adjust the stereo recording width and orientation. The central direction of the stereo microphone arrangement is then oriented to the preferred position of the user in front of the screen. The fact that d1 is smaller than d3 and that d2 is smaller than d4 allow to position the first holes outside the screen area on the front side and the second holes can then be positioned on the back side of the housing behind the screen, which allow to save some space in the housing as the microphones can be physically positioned behind the screen. The front holes can then be positioned just at the edge of the screen.

It is to be noted that the distances d1, d2, d3 and d4 can be different for each microphone and can be defined such as to obtain a desired stereo recording width and central direction of the stereo microphone arrangement.

In a seventh possible implementation form of the portable electronic device according to the first aspect as such or according to any of the preceding implementation forms of the first aspect, the portable electronic device comprises at least three directional microphones being arranged along two adjacent sides of the portable electronic device, one of the at least three directional microphones being common to both adjacent sides and two other of the at least three directional microphones being arranged at different ones of the two adjacent sides of the portable electronic device.

In an eighth possible implementation form of the portable electronic device according to the seventh implementation form of the first aspect, the portable electronic device further comprises: a gyroscope for detecting an orientation of the portable electronic device; and a controller, wherein the controller is configured to select a pair of the at least three directional microphones for stereo recording depending on the orientation of the portable electronic device.

In a ninth possible implementation form of the portable electronic device according to the eighth implementation form of the first aspect, the controller is configured to select the pair of the at least three directional microphones which is oriented horizontally or closest to the horizontal orientation.

In a tenth possible implementation form of the portable electronic device according to the eighth implementation form of the first aspect or according to the ninth implementation form of the first aspect, the controller is configured to switch selection of the pair of the at least three directional microphones from a first pair to a second pair during movement of the portable electronic device depending on the orientation of the portable electronic device.

In an eleventh possible implementation form of the portable electronic device according to the tenth implementation form of the first aspect, the controller is configured to perform a switching by applying a weighted combination of at least three directional microphones depending on the orientation of the portable electronic device. This switching by applying a weighted combination of at least three directional microphones is also referred to as smooth switching of directional microphones.

In a twelfth possible implementation form of the portable electronic device according to any of the eighth to the eleventh implementation forms of the first aspect, the portable electronic device comprises at least four directional microphones being arranged at different corners of the portable electronic device, wherein the controller is configured to select at least a pair of the at least four directional microphones for stereo recording depending on the orientation of the portable electronic device. This selection of at least a pair of the at least four directional microphones for stereo recording is also referred to as smooth selection of pairs of directional microphones.

In a thirteenth possible implementation form of the portable electronic device according to the first aspect as such or according to any of the preceding implementation forms of the first aspect, the at least two directional microphones are cardioid microphones or figure-eight microphones.

In a fourteenth possible implementation form of the portable electronic device according to the first aspect as such or according to any of the preceding implementation forms of the first aspect, a thickness of the housing is smaller than 2 cm, in particular smaller than 1 cm.

In a fifteenth possible implementation form of the portable electronic device according to the first implementation form of the first aspect, the first hole for the first directional microphone and the first hole for the second directional microphone are located in the back side and the second hole for the first directional microphone and the second hole for the second directional microphone are located in the front side of the housing such that directivity polar patterns of the two directional microphones are oriented towards the back side of the housing.

In a sixteenth possible implementation form of the portable electronic device according to the first aspects, the at least two directional microphones are placed non-coincidentally in the housing such that a direct sound direction of each microphone is oriented towards the first hole and the opposite sound direction of each microphone is oriented towards the second hole.

According to a second aspect, the invention relates to a method for producing a portable electronic device, comprising: providing at least two directional microphones for stereo sound pickup, each one of the two directional microphones defining a direct sound direction and an opposite sound direction towards which the directional microphones are directed; providing a housing comprising for each of the directional microphones a first hole and a second hole, the first hole being located at a different side of the housing than the second hole.

In a first implementation form of the portable electronic device according to the second aspect, the at least two directional microphones are placed non-coincidentally in the housing such that a direct sound direction of each microphone is oriented towards the first hole and the opposite sound direction of each microphone is oriented towards the second hole.

According to a third aspect, the invention relates to a method for operating a portable electronic device, comprising: operating the portable electronic device comprising at least two directional microphones for stereo sound pickup, each one of the two directional microphones defining a direct sound direction and an opposite sound direction towards which the directional microphones are directed; a housing comprising for each of the directional microphones a first hole and a second hole, the first hole being located at a different side of the housing than the second hole, wherein a direct sound direction of each microphone is oriented towards the first hole and the opposite sound direction of each microphone is oriented towards the second hole.

In a first implementation form of the method for operating a portable electronic device according to the third aspect, the at least two directional microphones are placed non-coincidentally in the housing.

Further implementation forms of the method for operating a portable electronic device according to the third aspect relate to methods for operating any of the implementation forms of the portable electronic device according to the first aspect.

BRIEF DESCRIPTION OF THE DRAWINGS

Further embodiments of the invention will be described with respect to the following figures, in which.

DETAILED DESCRIPTION

Figure 1:
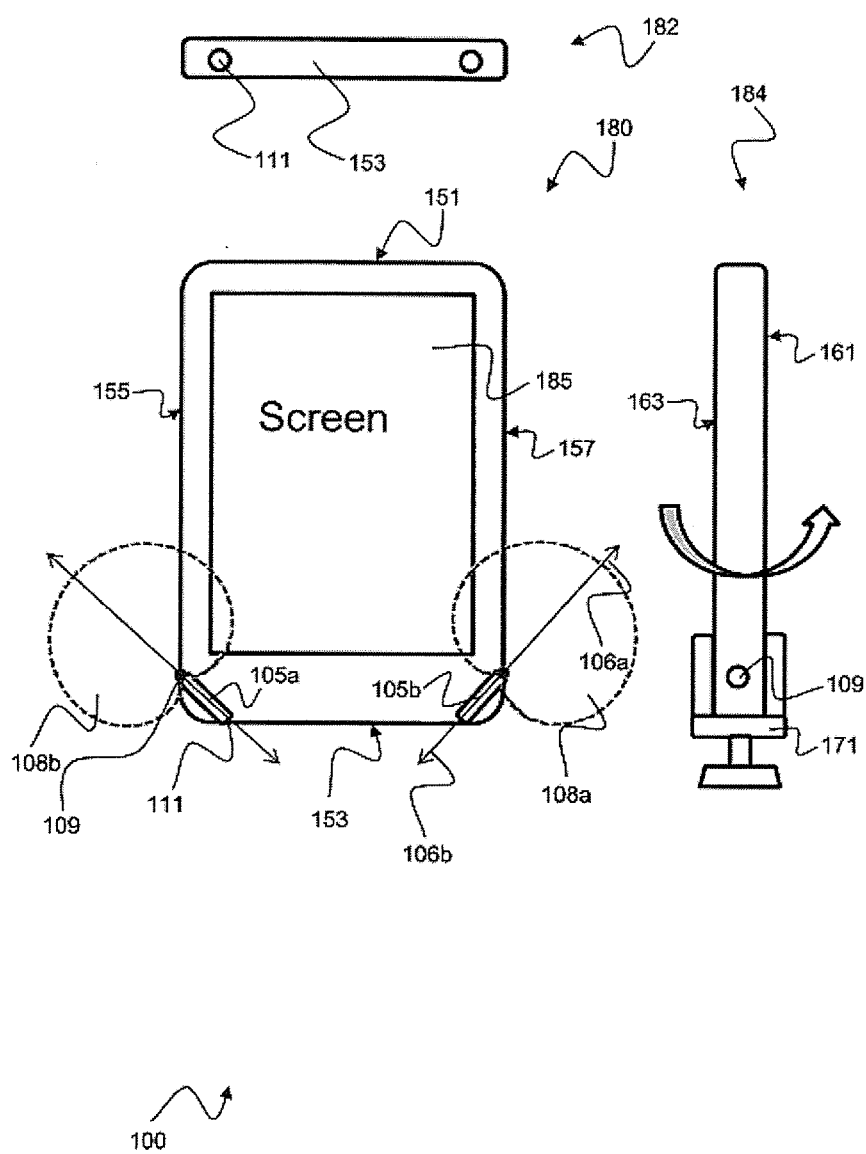
FIG. 1 shows a perspective diagram including front view, bottom view and side view of a portable electronic device arranged in portrait position according to an implementation form.

FIG. 1 shows a perspective diagram including front view 180, bottom view 182 and side view 184 of a portable electronic device 100 arranged in portrait position according to an implementation form.

The portable electronic device 100 comprises two directional microphones 105a, 105b for stereo sound pickup. Each one of the two directional microphones 105a, 105b defines a direct sound direction 106a and an opposite sound direction 106b towards which the directional microphones 105a, 105b are directed. The portable electronic device 100 comprises a housing 101 for housing the portable electronic device, i.e., the electronic circuits and printed circuit board of the portable electronic device 100, for example. For each of the directional microphones 105a, 105b a first hole 109 and a second hole 111 are arranged in the housing, the first hole 109 is located at a different side of the portable electronic device 100 than the second hole 111. When the housing 101 has the typical form of a mobile phone housing, i.e., as a rectangular hollow plate with round edges, the first holes 109 of both microphones 105a, 105b are located at the longer lateral sides of the housing 101 (and thus of the portable electronic device 100) and the second holes 111 of both microphones are both located at the bottom side. In an alternative implementation form, the first holes 109 of both microphones 105a, 105b are located at the longer lateral sides of the housing 101 (and thus of the portable electronic device 100) and the second holes 111 of both microphones are both located at the top side. FIG. 1 shows the portable electronic device hold in portrait mode by a device holder 171. The top side of the housing 101 (and thus of the portable electronic device 100) corresponds to the top side in the front view 180 of the Figure and the bottom side of the housing 101 (and thus of the portable electronic device 100) corresponds to the bottom side in the front view 180 of the Figure.

The two directional microphones 105a, 105b are placed non-coincidentally in the housing 101 (and thus in the portable electronic device 100), i.e., not placed at the same position of the housing 101, which means placed at different positions in the housing 101. The direct sound direction 106a of each microphone 105a, 105b is oriented towards the first hole 109 and the opposite sound direction 106b of each microphone 105a, 105b is oriented towards the second hole 111.

In an implementation form, the portable electronic device is a mobile phone. In an implementation form, the portable electronic device is a Smartphone. In an implementation form, the portable electronic device is a Tablet PC.

Figure 11:
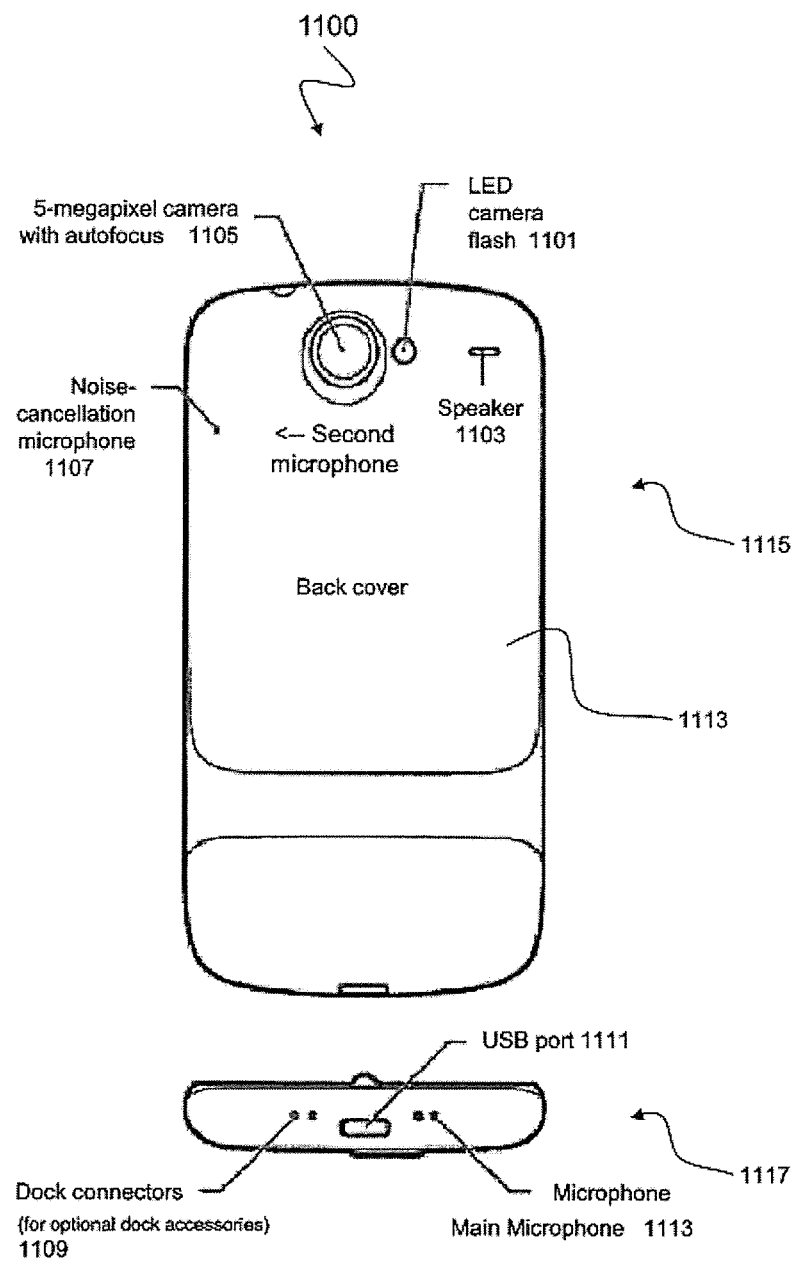
FIG. 11 shows a perspective diagram including back view and bottom view of a conventional mobile phone.

The housing 101 is formed as a hollow plate defined by two main areas, which are the areas of largest size, which are here the area carrying the screen 185 and the area opposite thereof, i.e., the back cover side which may carry the camera as depicted in FIG. 11. These two main areas define the front side 161 and the back side 163 of the housing 101. The front side 161 and the back side 163 are framed by a top side 151, a bottom side 153 and a first 155 and a second 157 lateral side. The top side 151 is located at the top of the mobile device 100 in the front view 180 illustration of FIG. 1. The bottom side 153 is located at the bottom of the mobile device 100 in the front view 180 illustration. The first lateral side 155 is located at the left side of the mobile device 100 in the front view 180 illustration and the second lateral side 157 is located at the right side of the mobile device 100 in the front view 180 illustration.

In an implementation form, the housing 101 is formed as a rectangular plate. In an implementation form, the housing is formed as a square plate.

In an implementation form, the two directional microphones 105a, 105b are cardioid microphones or figure-eight microphones. In an implementation form, the housing 101 has a thickness smaller than 2 cm, e.g., when the housing 101 houses a Notebook. In an implementation form, the housing 101 has a thickness smaller than 1 cm, e.g., when the housing 101 houses a TabletPC. In an implementation form, the housing 101 has a thickness smaller than 0.8 cm, e.g., when the housing 101 houses a mobile phone or a Smartphone.

The first hole 109 for the first directional microphone 105a is located in the first lateral side 155, i.e. in the left side of the housing 101. The first hole 109 for the second directional microphone 105b is located in the second lateral side 157, i.e., in the right side of the housing 101. The second holes 111 for the first and second microphones 105a, 105b are located in the bottom side 153 of the housing. According to this positioning of the holes 109, 111, the directivity polar patterns 108a, 108b of the two directional microphones 105a, 105b are directed towards the lateral sides 155, 157 of the housing 101.

In an alternative implementation form, the second holes 111 for the first and second microphones 105a, 105b are located in the top side 151 of the housing 101. According to this positioning of the holes 109, 111, the directivity polar patterns 108a, 108b of the two directional microphones 105a, 105b are also directed towards the lateral sides 155, 157 of the housing 101.

Unlike omnidirectional microphones, directional microphones need two holes 109, 111 in the housing 101 in order to measure the sound pressure gradient. The two directional microphones 105a, 105b are placed along the long side of the device. There are two holes 111 in the short side 153 of the device 100 and the other hole 109 of each directional microphone 105a, 105b is placed in the long side 155, 157 of the device 100. The directivity polar patterns 108a, 108b of the two microphones 105a, 105b are directed toward the long sides 155, 157 of the device 100.

Figure 2:
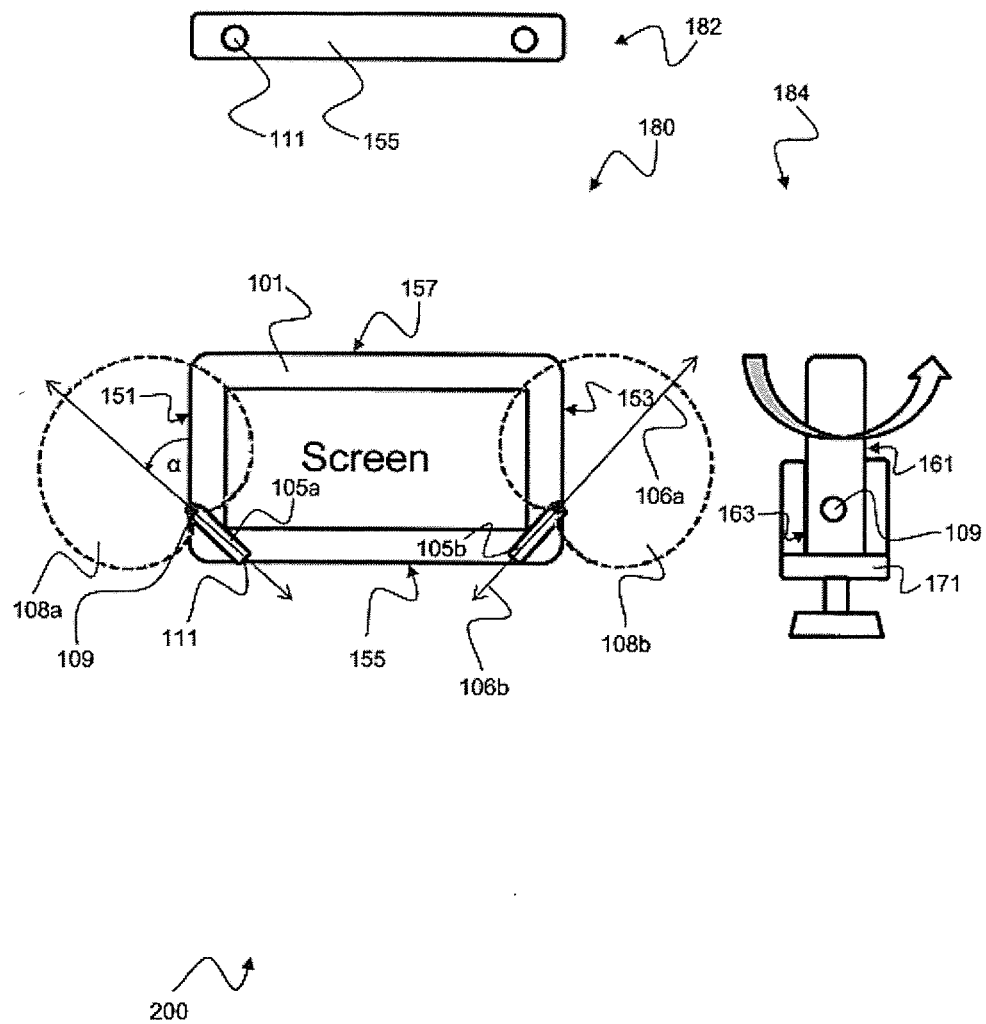
FIG. 2 shows a perspective diagram including front view, bottom view and side view of a portable electronic device arranged in landscape position according to an implementation form.

FIG. 2 shows a perspective diagram including front view 180, bottom view 182 and side view 184 of a portable electronic device 200 arranged in landscape position according to an implementation form.

The portable electronic device 200 comprises two directional microphones 105a, 105b for stereo sound pickup. Each one of the two directional microphones 105a, 105b defines a direct sound direction 106a and an opposite sound direction 106b towards which the directional microphones 105a, 105b are directed. The portable electronic device 100 comprises a housing 101 for housing the electronic circuits and printed circuit board of the portable electronic device 200. For each of the directional microphones 105a, 105b a first hole 109 and a second hole 111 are arranged in the housing 101, the first hole 109 is located at a different side of the housing 101 than the second hole 111.

The first hole 109 for the first directional microphone 105a is located in the top side 151 which is further designated as top side although by the movement from portrait mode with respect to FIG. 1 to landscape mode with respect to FIG. 2 the top side 151 is now located at the left side of the front view 180 depicted in FIG. 2. Thus, FIG. 2 illustrates the portable electronic device 200 rotated by 90 degree counterclockwise with respect to the representation depicted in FIG. 1.

The first hole 109 for the second directional microphone 105b is located in the bottom side 153 which is further designated as bottom side although by the movement from portrait mode with respect to FIG. 1 to landscape mode with respect to FIG. 2 the bottom side 153 is now located at the right side of the front view 180 depicted in FIG. 2. The second holes 111 for the first and second microphones 105a, 105b are located in the first lateral side 155 or in the second lateral side 157 of the housing 101 which are further designated as first and second lateral sides 155, 157 although by the movement from portrait mode with respect to FIG. 1 to landscape mode with respect to FIG. 2 the first lateral side 155 is now located at the bottom side and the second lateral side 157 is now located at the at the top side of the front view 180 depicted in FIG. 2. By that location of the holes 109, 111 and microphones 105a, 105b the directivity polar patterns 108a, 108b of the two directional microphones 105a, 105b are directed towards the top and bottom sides 151, 153 of the housing 101.

When the housing 101 has the typical form of a mobile phone housing, i.e., as a rectangular hollow plate with round edges, the second holes 111 of both microphones 105a, 105b are both located in the longer first lateral side 155 of the housing 101, the first hole 109 of the first microphone 105a is located in the top side 151 and the first hole 109 of the second microphone 105b is located in the bottom side 153 of the housing 101.

In FIG. 2, there are two holes 111 in the long side 155 of the device 200. And the other hole 109 of each directional microphone 105a, 105b is placed in the short side 151, 153 of the device 200. The directivity polar patterns 108a, 108b of the two microphones 105a, 105b are directed toward the short sides 151, 153 of the device 200. The angle α of each microphone 105a, 105b determines the stereo image width.

Figure 3:
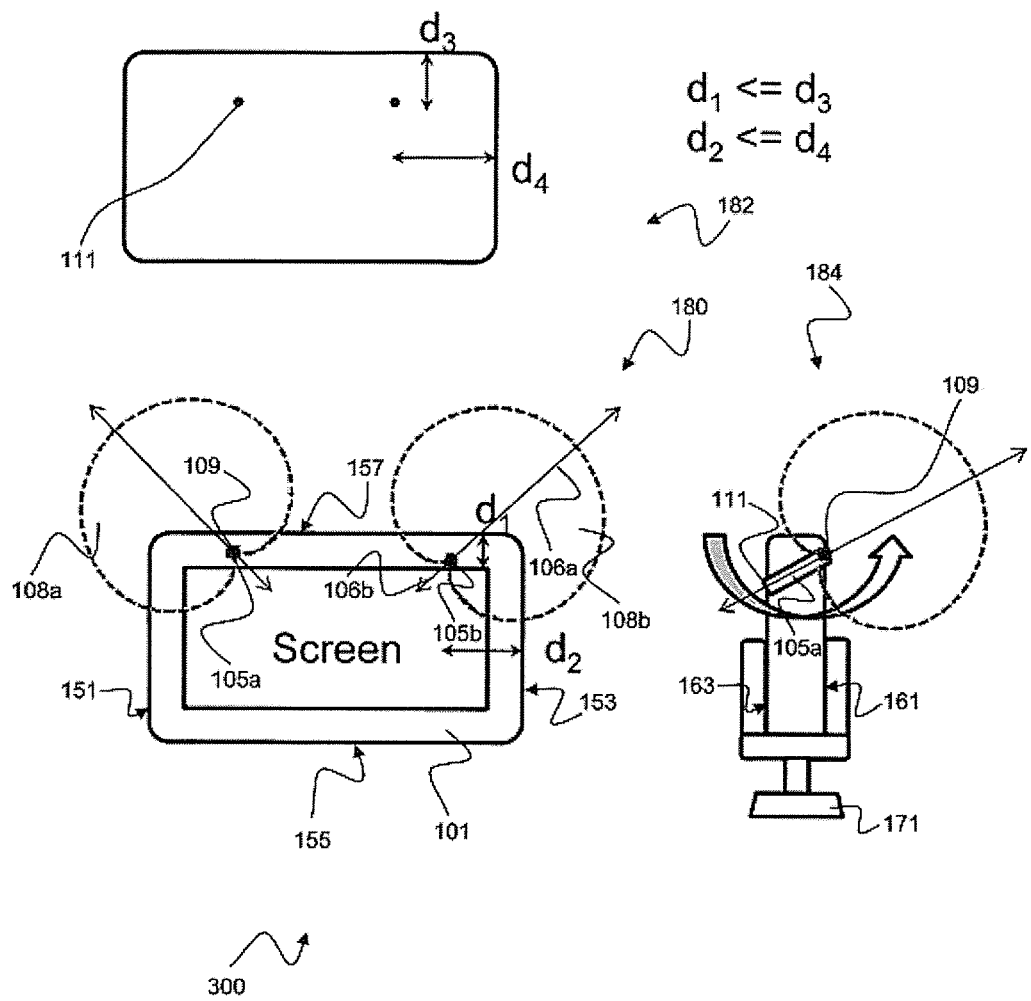
FIG. 3 shows a perspective diagram including front view, back view and side view of a portable electronic device arranged in landscape position according to an implementation form.

FIG. 3 shows a perspective diagram including front view 180, back view 186 and side view 184 of a portable electronic device 300 arranged in landscape position according to an implementation form.

The portable electronic device 300 comprises two directional microphones 105a, 105b for stereo sound pickup. Each one of the two directional microphones 105a, 105b defines a direct sound direction 106a and an opposite sound direction 106b towards which the directional microphones 105a, 105b are directed. The portable electronic device 300 comprises a housing 101 for housing the electronic circuits and printed circuit board of the portable electronic device 300. For each of the directional microphones 105a, 105b a first hole 109 and a second hole 111 are arranged in the housing 101, the first holes 109 for both microphones 105a, 105b are located in the front side 161 of the housing 101 and the second holes 111 for both microphones 105a, 105b are located in the back side 163 of the housing 101. By that arrangement, the directivity polar patterns 108a, 108b of the two directional microphones 105a, 105b are oriented towards the front side 161 of the housing 101.

In an alternative implementation form not shown in FIG. 3, the first hole 109 for the first directional microphone 105a and the first hole 109 for the second directional microphone 105b are located in the back side 163 and the second hole 111 for the first directional microphone 105a and the second hole 111 for the second directional microphone 105b are located in the front side 161 of the housing 101. By that arrangement, the directivity polar patterns 108a, 108b of the two directional microphones 105a, 105b are oriented towards the back side 161 of the housing 101.

In the implementation form of the portable electronic device 300 depicted in FIG. 3, the first hole 109 for the first directional microphone 105a is located in the front side 161 within a first distance d1 from the second lateral side 157 of the housing 101 and the second hole 111 for the first directional microphone 105a is located in the back side 163 within a third distance d3 from the second lateral side 157 of the housing 101. The third distance d3 is greater or equal than the first distance d1, i.e., d1<=d3. A difference of the third distance d3 and the first distance d1 is dimensioned for determining a width of the directivity polar patterns 108a, 108b of the two directional microphones 105a, 105b with respect to the second lateral side 157 of the housing 101 and, furthermore, for determining a stereo recording width of the stereo recording arrangement formed by the two directional microphones. The first hole 109 for the first directional microphone 105a is located in the front side 161 within a second distance d2 from the bottom side 153 of the housing 101 and the second hole 111 for the first directional microphone 105a is located in the back side 163 within a fourth distance d4 from the bottom side 153 of the housing 101. The fourth distance d4 is greater or equal than the second distance d2, i.e., d2<=d4. A difference of the fourth distance d4 and the second distance d2 is dimensioned for determining a width of the directivity polar patterns 108a, 108b of the two directional microphones 105a, 105b with respect to the bottom side 153 of the housing 101 and, furthermore, for determining a stereo recording width of the stereo recording arrangement formed by the two directional microphones.

This alternative implementation form with respect to the implementation form depicted in FIG. 1 or FIG. 2 is also based on two directional microphones 105a, 105b. The holes 109, 111 of each directional microphone 105a, 105b are placed in the opposite sides, i.e., front side 161 and back side 163 of the device 300 respectively. The four distances d1, d2, d3 and d4 are used to define the position of the holes 109, 111 associated with directional microphones 105a, 105b. As such they define the orientation of the directivity pattern 108a, 108b, i.e., the direct sound direction toward which the directional microphones 105a, 105b will be directed. If d2 is smaller than d4, the width of the stereo image is increased when the difference d4−d2 is increased. Similarly, if d1 is smaller than d3, the microphones 105a, 105b will be directed more toward the top of the device 300 which is in the front view 180 of FIG. 3 the second lateral side 157 defined with respect to the portrait orientation depicted in FIG. 1. That orientation gives less height impression. In a preferred embodiment, d1 is equal to d3 and the microphones 105a, 105b are directed to the front of the device, i.e. to the expected position of the user when looking at the screen 185. This embodiment has improved flexibility of the orientation of the stereo directivity pattern. The main stereo direction or central direction can point to the user if the user is in front of the mobile device 300.

Figure 4:
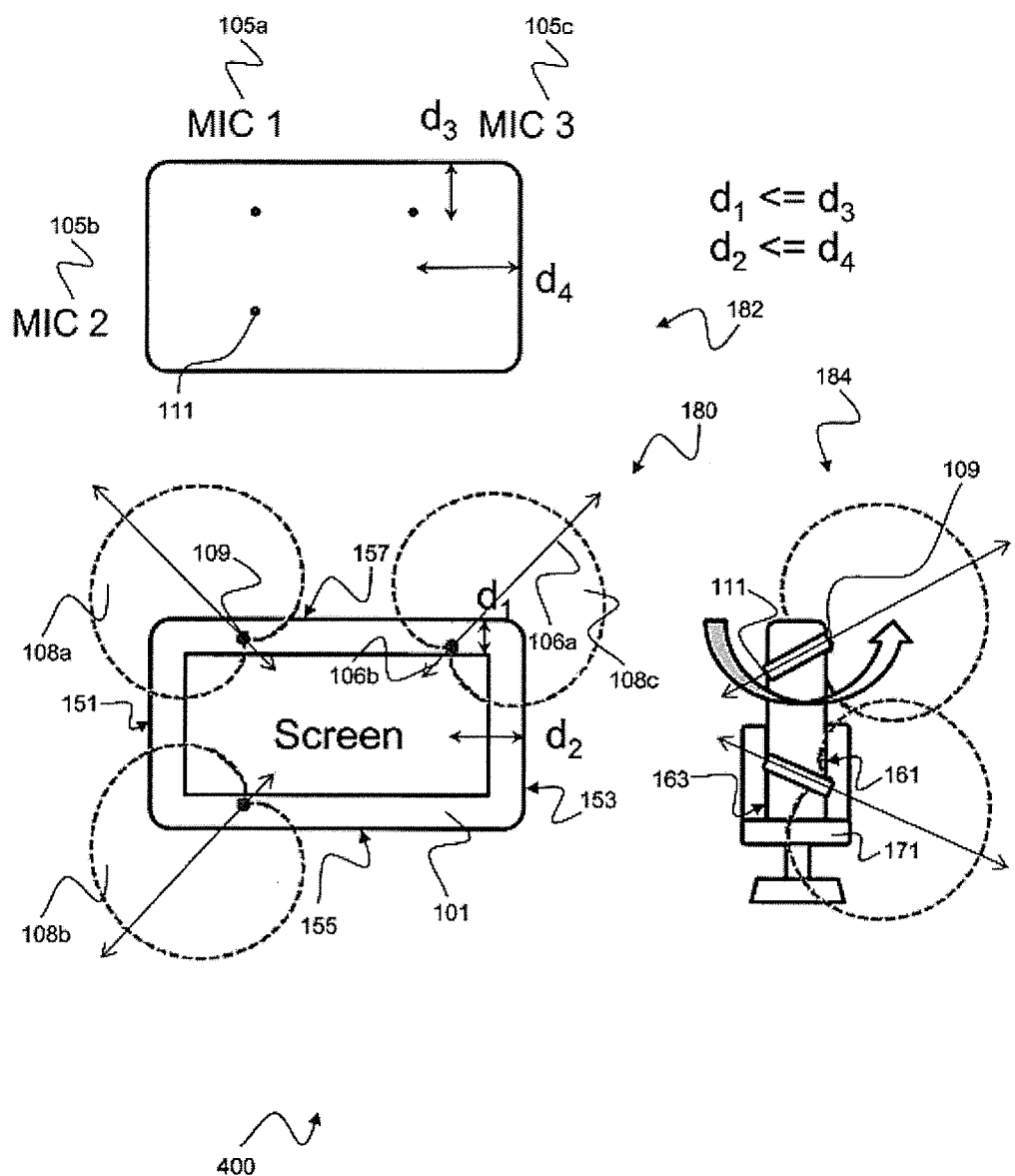
FIG. 4 shows a perspective diagram including front view, back view and side view of a portable electronic device arranged in landscape position according to an implementation form.

FIG. 4 shows a perspective diagram including front view 180, back view 186 and side view 184 of a portable electronic device 400 arranged in landscape position according to an implementation form.

The portable electronic device 400 comprises three directional microphones 105a, 105b and 105c for stereo sound pickup. Each one of the three directional microphones 105a, 105b, 105c defines a direct sound direction 106a and an opposite sound direction 106b towards which the directional microphones 105a, 105b, 105c are directed. The portable electronic device 400 comprises a housing 101 for housing the electronic circuits and printed circuit board of the portable electronic device 400. For each of the directional microphones 105a, 105b, 105c a first hole 109 and a second hole 111 are arranged in the housing 101, the first holes 109 for all three microphones 105a, 105b, 105c are located in the front side 161 of the housing 101 and the second holes 111 for all three microphones 105a, 105b, 105c are located in the back side 163 of the housing 101 according to the arrangement depicted in FIG. 3. By that arrangement, the directivity polar patterns 108a, 108b, 108c of the three directional microphones 105a, 105b, 105c are oriented towards the front side 161 of the housing 101.

The three directional microphones 105a, 105b, 105c are arranged along two adjacent sides of the portable electronic device 400. The first directional microphone 105a is common to both adjacent sides and the second 105b and third 105c directional microphones are arranged at different ones of the two adjacent sides of the portable electronic device 400. The first directional microphones 105a is arranged at the first lateral side 157 and at the top side 151 while the second directional microphone 105b is arranged at the top side 151 and the third directional microphone 105c is arranged at the first lateral side 157 according to the definition of the sides of the housing 101 with respect to FIG. 1.

In an implementation form, the portable electronic device 400 comprises a gyroscope for detecting an orientation of the portable electronic device 400 and a controller for selecting a pair of microphones from the three directional microphones 105a, 105b and 105c for stereo recording depending on the orientation of the portable electronic device 400. In an implementation form, the controller is configured to select the pair of the three directional microphones 105a, 105b, 105c which is located at the top of the portable electronic device 400. In an implementation form, the controller is configured to switch selection of the pair of the three directional microphones 105a, 105b and 105c from a first pair to a second pair during movement of the portable electronic device 400 depending on the orientation of the portable electronic device 400. In an implementation form, the controller is configured to perform a smooth switching by applying a weighted combination of the three directional microphones 105a, 105b, 105c depending on the orientation of the portable electronic device 400.

This alternative implementation form can select the microphone pair based on gyroscope, i.e. on the orientation of the device 400. In FIG. 4, when the mobile device 400 is in landscape mode, the Mic 1, 105a and Mic 3, 105c are selected for the stereo recording. In portrait mode, Mic 1, 105a and Mic2, 105b are selected for the stereo recording. It should be noted that the microphones corresponding to the left and right respectively depend on the actual bottom-up orientation.

Figure 5:
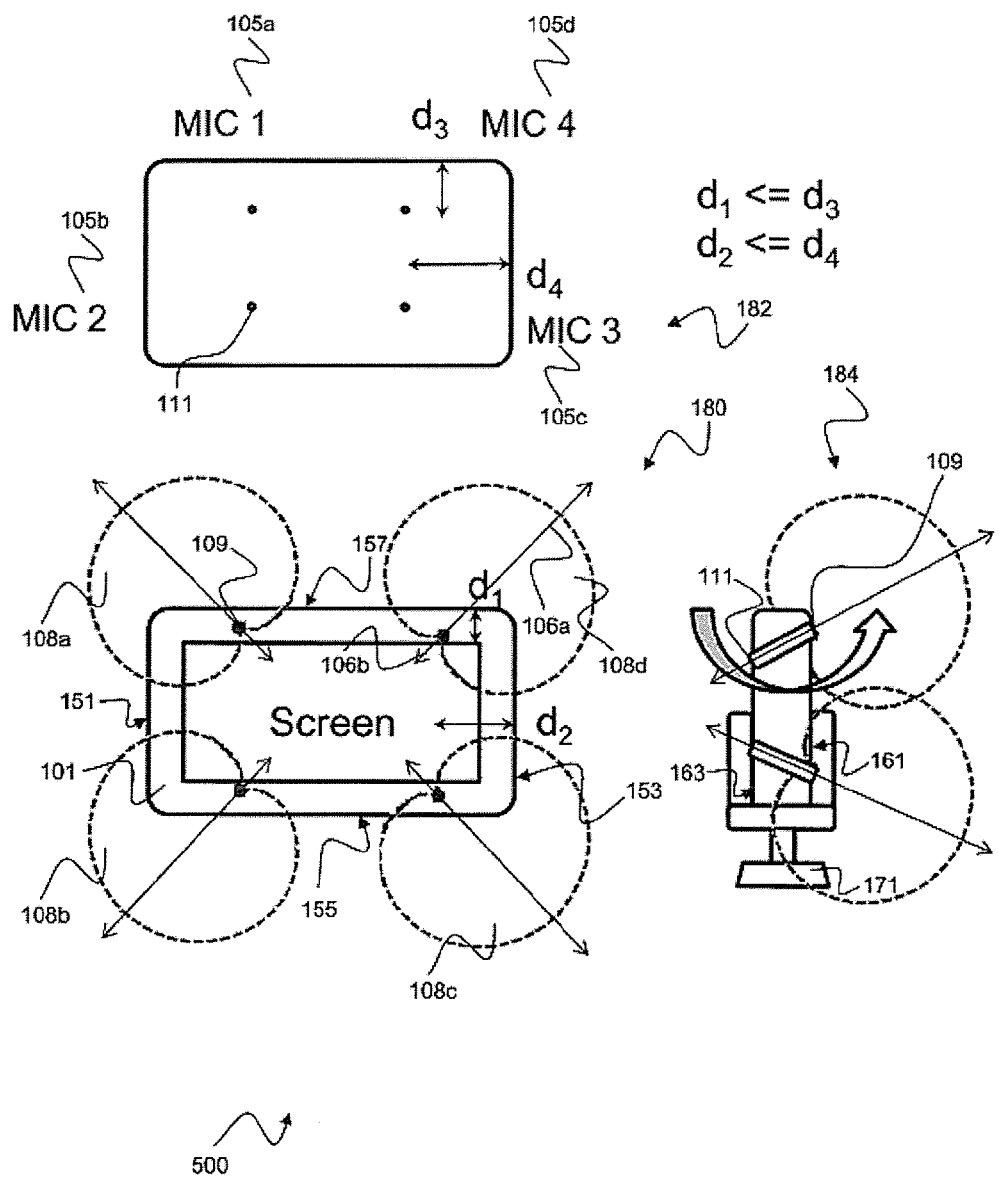
FIG. 5 shows a perspective diagram including front view, back view and side view of a portable electronic device arranged in landscape position according to an implementation form.

FIG. 5 shows a perspective diagram including front view 180, back view 186 and side view 184 of a portable electronic device 500 arranged in landscape position according to an implementation form.

The portable electronic device 500 comprises four directional microphones 105a, 105b, 105c and 105d for stereo sound pickup. The four directional microphones 105a, 105b, 105c and 105d are arranged at different corners of the portable electronic device 500. Each one of the four directional microphones 105a, 105b, 105c and 105d defines a direct sound direction 106a and an opposite sound direction 106b towards which the directional microphones 105a, 105b, 105c and 105d are directed. The portable electronic device 500 comprises a housing 101 for housing the electronic circuits and printed circuit board of the portable electronic device 500. For each of the directional microphones 105a, 105b, 105c and 105d a first hole 109 and a second hole 111 are arranged in the housing 101, the first holes 109 for all four microphones 105a, 105b, 105c and 105d are located in the front side 161 of the housing 101 and the second holes 111 for all four microphones 105a, 105b, 105c and 105d are located in the back side 163 of the housing 101 according to the arrangement depicted in FIGS. 3 and 4. By that arrangement, the directivity polar patterns 108a, 108b, 108c, 108d of the four directional microphones 105a, 105b, 105c and 105d are oriented towards the front side 161 of the housing 101.

In an implementation form, the portable electronic device 500 comprises a gyroscope for detecting an orientation of the portable electronic device 500 and a controller for selecting a pair of microphones from the four directional microphones 105a, 105b, 105c and 105d for stereo recording depending on the orientation of the portable electronic device 500. In an implementation form, the controller is configured to select the pair of the four directional microphones 105a, 105b, 105c and 105d which is located at the top of the portable electronic device 500. In an implementation form, the controller is configured to switch selection of the pair of the four directional microphones 105a, 105b, 105c and 105d from a first pair to a second pair during movement of the portable electronic device 500 depending on the orientation of the portable electronic device 500. In an implementation form, the controller is configured to smoothly select a pair of the four directional microphones 105a, 105b, 105c and 105d for stereo recording depending on the orientation of the portable electronic device 500. In an implementation form, the controller is configured to perform a smooth switching by applying a weighted combination of three from the four directional microphones 105a, 105b, 105c and 105d depending on the orientation of the portable electronic device 500.

In the implementation form depicted in FIG. 5, during the transition between landscape and portrait orientation and vice versa, the pair of microphones is smoothly selected between the available microphones depending on the gyroscope information. The stereo image is based on at least three microphones by a weighted combination allowing a smooth transition of the orientation. The stereo image can be defined as a combination of two pairs of microphones which gives more stability and provides improved height information. When the mobile device 500 is in landscape mode, the Mic 1, 105a and Mic 4, 105d (or Mic 2, 105b and Mic 3, 105c or a combination of those two pairs) are selected for the stereo recording. In portrait mode, Mic 1, 105a and Mic 2, 105b (or Mic 3, 105c and Mic 4, 105d or a combination of those two pairs) are selected for the stereo recording. The microphones corresponding to the left and right respectively depend on the actual bottom-up orientation. In FIG. 5, the same definitions as applied for the devices 100, 200, 300, 400 depicted in FIGS. 1 to 4 are used. During a transition, e.g. Mic 1, 105a and Mic 4, 105d being located at the top of the landscape mode in the initial mode and Mic 1, 105a and Mic 2, 105b being located at the top of the portrait mode for the final mode, the stereo recording will be based on a weighted combination of the microphones Mic 1, 105a, Mic 2, 105b and Mic 3, 105c.

Mic 1, 105a is the original right channel and Mic 4, 105d is the original left channel. When rotating to portrait, the final position will be Mic 2, 105b is the final right channel and Mic 1, 105a is the final left channel. At the intermediate position given by the gyroscope, Mic 2, 105b is the intermediate right channel and Mic 4, 105d is the intermediate left channel.

Between the original and intermediate positions, the channels are defined as:

$$L=\text{Mic}4,$$

$$R=a\text{ Mic }1+(1-a)\text{Mic }2.$$

"a" is a variable evolving from 1 to 0 between the initial and intermediate positions.

Between the intermediate and final positions, the channels are defined as:

$$L=a\text{ Mic}4+(1-a)\text{Mic }1,$$

$$R=\text{Mic }2.$$

"a" is a variable evolving from 1 to 0 between the intermediate and final positions.

The ways in which the user uses a portable electronic device 100, 200, 300, 400, 500 according to aspects of the invention to apply the stereo recording are described in the following FIGS. 6, 7 and 8.

Figure 6:
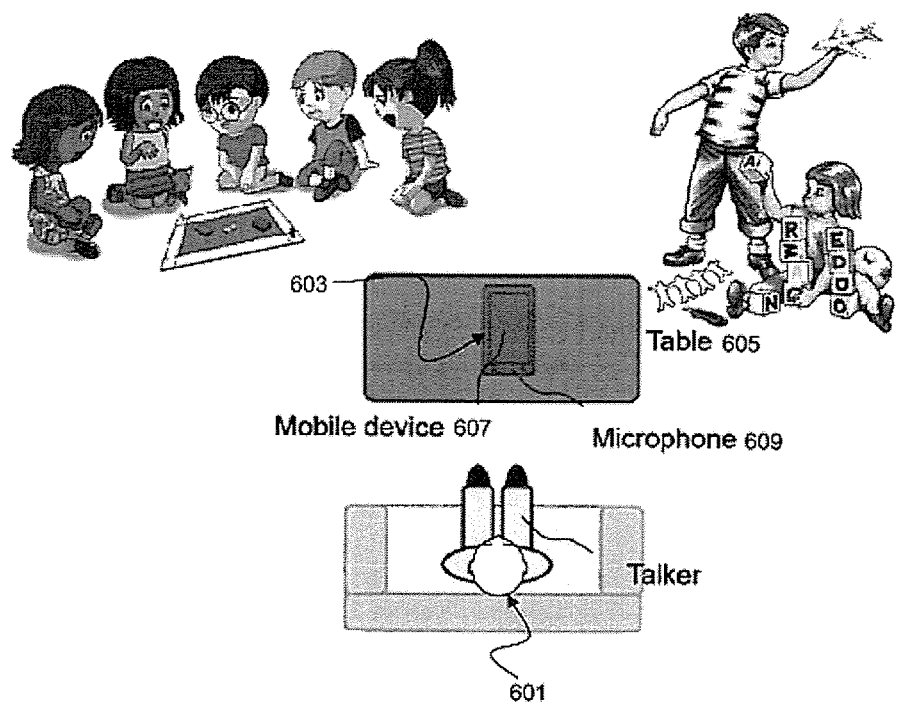
FIG. 6 shows a first scenario for operating a portable electronic device according to an implementation form.
Figure 9:
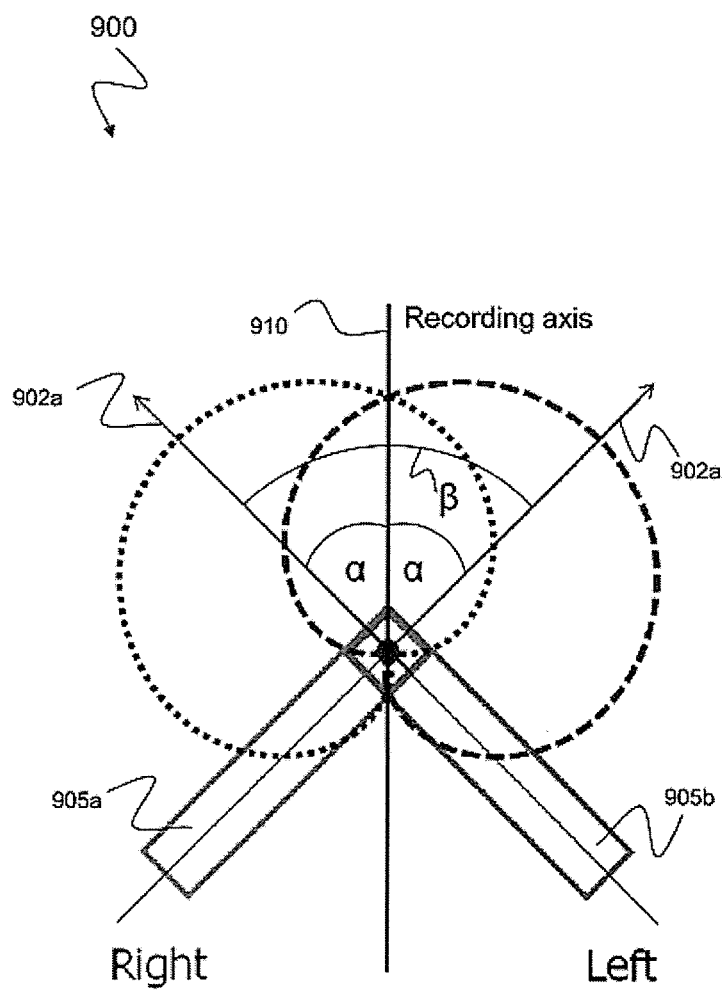
FIG. 9 shows a schematic diagram of two conventional xY microphones for stereo audio recording.
Figure 10:
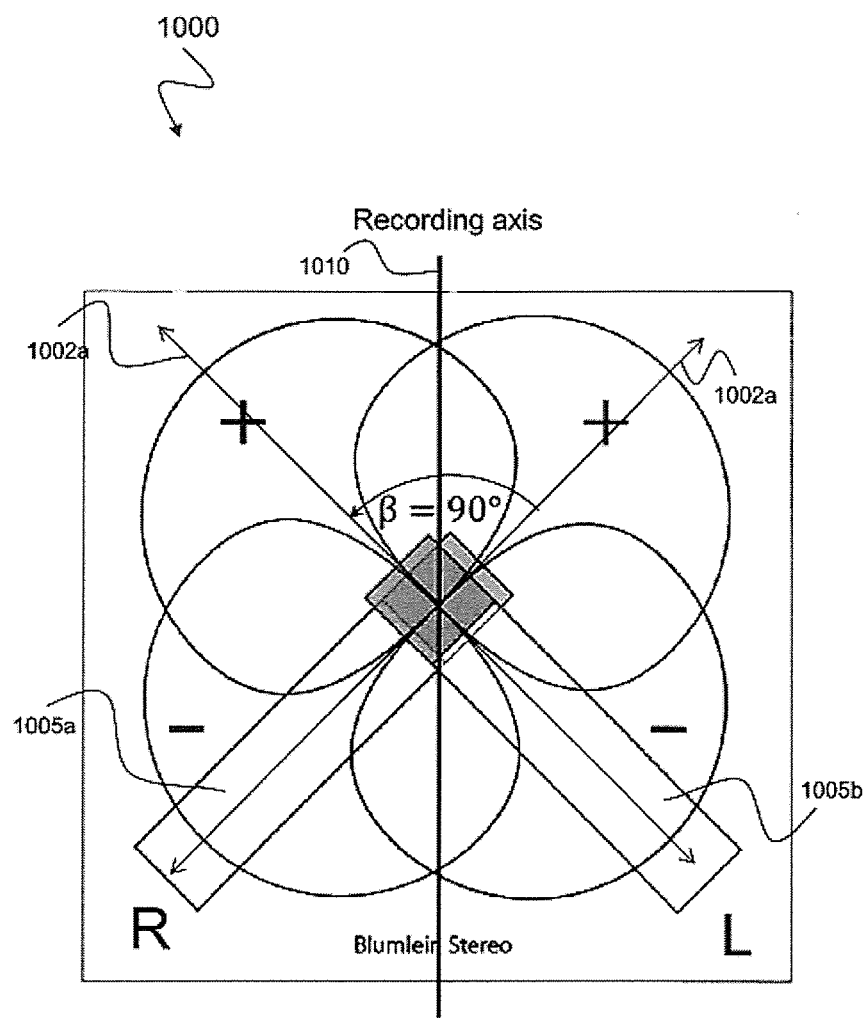
FIG. 10 shows a schematic diagram of a conventional Blumlein pair of microphones for stereo audio recording.

FIG. 6 shows a first scenario for operating a portable electronic device according to an implementation form. In the first scenario, the user 601 can put the device 603 down on the table 605 and the stereo sound pickup is done for the front, i.e., the screen side 607. The portable electronic devices 603 as described with respect to FIGS. 1 to 5 can be used in this scenario. The user 601 just puts down his mobile phone 603 on the table 605 and records every sound in his living room. The angle defining the orientation of the stereo sound recording, i.e., the main direction which is defined as the direction which is equidistant from each directional microphone direction according to the recording axis 910, 1010 as described with respect to FIGS. 9 and 10 can be defined in order to point toward the location of the main user, i.e., in front of the screen 607, or the position of the talker 601 who is in front of the table 605.

Figure 7:
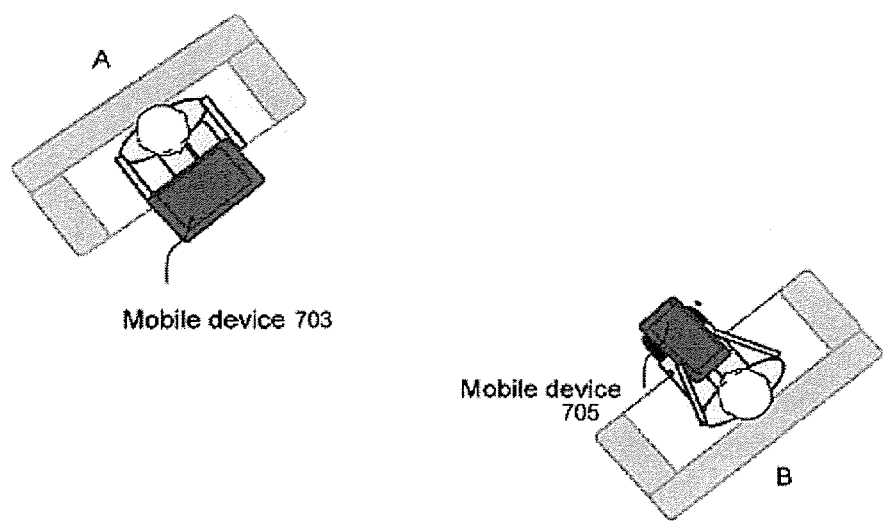
FIG. 7 shows a second scenario for operating a portable electronic device according to an implementation form.

FIG. 7 shows a second scenario for operating a portable electronic device according to an implementation form. In the second scenario, the user A, B can use the device 703 to make a point to point call. The portable electronic device as described with respect to FIGS. 4 and 5 can be used in this scenario. User A prefers to use the device 703 in a landscape orientation, and user B prefers portrait orientation. When A and B talk to each other, they can all enjoy the stereo communication. For the three microphones configuration, which is shown in FIG. 4, microphone 1 and 3 of user A's device 703 are enabled, and microphone 1 and 2 of user B's device 705 are enabled. For the four microphones configuration, which is shown in FIG. 5, microphone 1 and 4 or 2 and 3 of user A's device 703 are enabled, and microphone 1 and 2 or 3 and 4 of user B's device are enabled.

Figure 8:
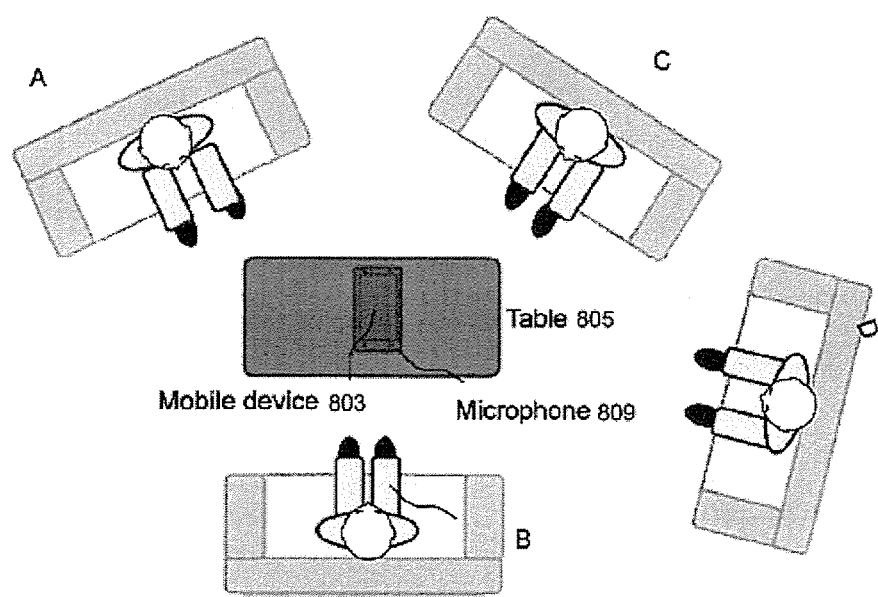
FIG. 8 shows a third scenario for operating a portable electronic device according to an implementation form.

FIG. 8 shows a third scenario for operating a portable electronic device 803 according to an implementation form. In the third scenario, the users A, B, C, D can use this device 803 to make a conference call. They can just put it on the table 805 and seat around the table 805. The portable electronic device 803 as described with respect to FIG. 5 can be used in this scenario. The voice of every participant A, B, C, D around the table 805 can be recorded properly with correct spatial cues. The participant at the other end of the conference call can easily recognize the people A, B, C, D and the associated position.

What is claimed is:

1. A portable electronic device, comprising:
at least two directional microphones for stereo sound pickup, each one of the two directional microphones defining a direct sound direction and an opposite sound direction towards which the directional microphones are directed; and
a housing comprising for each of the directional microphones a first hole and a second hole, the first hole being located at a different side of the housing of the portable electronic device than the second hole;
wherein the direct sound direction of each microphone is oriented towards the first hole and the opposite sound direction of each microphone is oriented towards the second hole;
wherein the housing is configured for housing the portable electronic device and is formed as a plate defined by two main areas framed by a top side, a bottom side and a first and a second lateral side, wherein the two main areas define a front side and a back side of the housing; and
wherein the first hole for a first directional microphone is located in the first lateral side, the first hole for a second directional microphone is located in the second lateral side and the second holes for the first and second microphones are located in the bottom side or in the top side of the housing such that directivity polar patterns of the two directional microphones are directed towards the lateral sides of the housing.

2. A portable electronic device, comprising:
at least two directional microphones for stereo sound pickup, each one of the two directional microphones defining a direct sound direction and an opposite sound direction towards which the directional microphones are directed; and
a housing comprising for each of the directional microphones a first hole and a second hole, the first hole being located at a different side of the housing of the portable electronic device than the second hole;
wherein the direct sound direction of each microphone is oriented towards the first hole and the opposite sound direction of each microphone is oriented towards the second hole;
wherein the housing is configured for housing the portable electronic device and is formed as a plate defined by two main areas framed by a top side, a bottom side and a first and a second lateral side, wherein the two main areas define a front side and a back side of the housing; and
wherein the first hole for a first directional microphone is located in the top side, the first hole for a second directional microphone is located in the bottom side and the second holes for the first and second microphones are located in the first lateral side or in the second lateral side of the housing such that directivity polar patterns of the two directional microphones are directed towards the top and bottom sides of the housing.

3. A portable electronic device, comprising:
at least two directional microphones for stereo sound pickup, each one of the two directional microphones defining a direct sound direction and an opposite sound direction towards which the directional microphones are directed; and
a housing comprising for each of the directional microphones a first hole and a second hole, the first hole being located at a different side of the housing of the portable electronic device than the second hole,
wherein the direct sound direction of each microphone is oriented towards the first hole and the opposite sound direction of each microphone is oriented towards the second hole;
wherein the housing is configured for housing the portable electronic device and is formed as a plate defined by two main areas framed by a top side, a bottom side and a first and a second lateral side, wherein the two main areas define a front side and a back side of the housing;
wherein the first hole for a first directional microphone and the first hole for a second directional microphone are located in the front side and wherein the second hole for the first directional microphone and the second hole for the second directional microphone are located in the back side of the housing such that directivity polar patterns of the two directional microphones are oriented towards the front side of the housing.

4. The portable electronic device of claim 3, wherein:
the first hole for the first directional microphone is located in the front side within a first distance (d1) from a lateral side of the housing and the second hole for the first directional microphone is located in the back side within a third distance (d3) greater or equal than the first distance (d1) from the lateral side of the housing; and
a difference of the third distance (d3) and the first distance (d1) is dimensioned for determining a stereo recording width of the stereo recording arrangement formed by the two directional microphones with respect to the lateral side of the housing.

5. The portable electronic device of claim 3, wherein:
the first hole for the first directional microphone is located in the front side within a second distance (d2) from the bottom side of the housing and the second hole for the first directional microphone is located in the back side within a fourth distance (d4) greater or equal than the third distance (d2) from the bottom side of the housing; and
a difference of the fourth distance (d4) and the second distance (d2) is dimensioned for determining a stereo recording width of the stereo recording arrangement formed by the two directional microphones with respect to the bottom side of the housing.

6. A portable electronic device, comprising:
at least two directional microphones for stereo sound pickup, each one of the two directional microphones defining a direct sound direction and an opposite sound direction towards which the directional microphones are directed;
a housing comprising for each of the directional microphones a first hole and a second hole, the first hole being located at a different side of the housing of the portable electronic device than the second hole;

wherein the direct sound direction of each microphone is oriented towards the first hole and the opposite sound direction of each microphone is oriented towards the second hole; and
at least three directional microphones being arranged along two adjacent sides of the portable electronic device, one of the at least three directional microphones being common to both adjacent sides and two other of the at least three directional microphones being arranged at different ones of the two adjacent sides of the portable electronic device.

7. The portable electronic device of claim 6, further comprising:
a gyroscope for detecting an orientation of the portable electronic device; and
a controller configured to select a pair of the at least three directional microphones for stereo recording depending on the orientation of the portable electronic device.

8. The portable electronic device of claim 7, wherein the controller is configured to select the pair of the at least three directional microphones which is oriented horizontally or closest to the horizontal orientation.

9. The portable electronic device of claim 7, wherein the controller is configured to switch selection of the pair of the at least three directional microphones from a first pair to a second pair during movement of the portable electronic device depending on the orientation of the portable electronic device.

10. The portable electronic device of claim 9, wherein the controller is configured to perform a switching by applying a weighted combination of at least three directional microphones depending on the orientation of the portable electronic device.

11. The portable electronic device of claim 7, further comprising at least four directional microphones being arranged at different corners of the portable electronic device, wherein the controller is configured to select at least a pair of the at least four directional microphones for stereo recording depending on the orientation of the portable electronic device.

12. The portable electronic device of claim 1, wherein the at least two directional microphones are cardioid microphones or figure-eight microphones.

13. The portable electronic device of claim 1, wherein a thickness of the housing is smaller than 2 cm.

14. The portable electronic device of claim 13, wherein the thickness of the housing is less than 1 cm.

15. The portable electronic device of claim 2, wherein the at least two directional microphones are cardioid microphones or figure-eight microphones.

16. The portable electronic device of claim 2, wherein a thickness of the housing is smaller than 2 cm.

17. The portable electronic device of claim 16, wherein the thickness of the housing is less than 1 cm.

18. The portable electronic device of claim 3, wherein the at least two directional microphones are cardioid microphones or figure-eight microphones.

19. The portable electronic device of claim 13 wherein a thickness of the housing is smaller than 2 cm.

20. The portable electronic device of claim 19, wherein the thickness of the housing is less than 1 cm.

21. The portable electronic device of claim 6, wherein the at least two directional microphones are cardioid microphones or figure-eight microphones.

22. The portable electronic device of claim 6 wherein a thickness of the housing is smaller than 2 cm.

23. The portable electronic device of claim 22, wherein the thickness of the housing is less than 1 cm.

\* \* \* \* \*